(12) United States Patent
Thomas, II et al.

(10) Patent No.: US 8,100,003 B1
(45) Date of Patent: Jan. 24, 2012

(54) TRANSVERSE MOTION MEASUREMENT IN GUN BARREL

(75) Inventors: Myron Lyn Thomas, II, Fredericksburg, VA (US); Carl Lee Sisemore, King George, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 455 days.

(21) Appl. No.: 12/456,271

(22) Filed: May 22, 2009

(51) Int. Cl.
*G01L 5/14* (2006.01)

(52) U.S. Cl. .......................................... 73/167; 346/38

(58) Field of Classification Search ............ 346/7, 33 D, 346/139 C, 38; 73/167
See application file for complete search history.

(56) References Cited

U.S. PATENT DOCUMENTS

| | | | |
|---|---|---|---|
| 1,915,289 A | | 6/1933 | Broadus |
| 2,523,474 A | * | 9/1950 | Mason ............................. 73/167 |
| 2,721,071 A | * | 10/1955 | Kempton ......................... 73/167 |
| 2,881,043 A | | 4/1959 | Rich et al. |
| 3,024,652 A | * | 3/1962 | Bross .............................. 73/167 |
| 3,220,008 A | * | 11/1965 | Weisman et al. .................. 346/7 |
| 3,765,235 A | | 10/1973 | Morrow ........................... 73/167 |
| 3,995,476 A | | 12/1976 | Hoffman .......................... 73/133 |
| 4,791,818 A | | 12/1988 | Wilde ......................... 73/861.24 |
| 5,317,914 A | * | 6/1994 | Franco, Jr. ...................... 73/167 |
| 6,349,652 B1 | | 2/2002 | Hepner et al. ................ 102/519 |

* cited by examiner

*Primary Examiner* — Robert R Raevis
(74) *Attorney, Agent, or Firm* — Gerhard W. Thielman, Esq

(57) ABSTRACT

A device is provided for recording transverse acceleration of a projectile longitudinally traveling along a barrel. Within the projectile, the device includes a base, a cantilever beam, a stylus and a medium. The beam longitudinally extends at a first end from the base. The stylus connects to a second end of the beam, being longitudinally opposite from the first end. The medium is rigidly fixed relative to the base and indicates transverse deflection extent of the second end onto the medium. The transverse deflection extent can be vertically perpendicular to the beam, and the stylus can permit deflection that is horizontally perpendicular to the beam. A method is provided for recording transverse acceleration of a projectile longitudinally traveling along a barrel that includes providing a base within the projectile, suspending a cantilever beam longitudinally within the projectile from the base from a first end of the beam, fixing a medium relative to the base, and connecting a stylus to a second end of said beam, the second end being opposite from the first end, the stylus indicating transverse deflection extent of the second end onto the medium.

5 Claims, 2 Drawing Sheets

TRANSVERSE MOTION MEASUREMENT IN GUN BARREL

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to measurement of transverse acceleration, also known as load balloting, along a gun barrel. In particular, the invention relates to techniques to measure load balloting using X-ray imagery.

Superficially, the dominant force in gun-launched projectiles appears to be axial compression (i.e., setback) of the projectile upon launch. Determination of this force is straightforward because the chamber pressure can be calculated from the propellant used to launch the projectile. Additionally, the axial acceleration of the projectile can also be calculated by measuring the muzzle velocity of the projectile.

Axial acceleration is not the only interior ballistics acceleration the designer must take into account. Transverse accelerations (commonly referred to as balloting) within the gun barrel can occur and have been known to cause structural failures within the projectile if the accelerations are severe. Even when not sufficiently severe to cause projectile failure, these accelerations can affect the transition phase of the projectile during exit from the muzzle to begin ballistic flight.

In-bore balloting causes can be produced by a variety of reasons; lack of barrel straightness, bore irregularities, variations in projectile center of mass, etc. Regardless of the cause, the effects can be severe and undesirable. Unlike axial acceleration, balloting is not easily calculated by simple analytical techniques, because its causes are not simple and can change as the gun barrel wears or due to differences in projectile manufacture. Conventionally, in-bore balloting is not easily measured.

SUMMARY

Conventional balloting measurement techniques yield disadvantages addressed by various exemplary embodiments of the present invention. In particular, various exemplary embodiments provide a device for recording transverse acceleration of a projectile longitudinally traveling along a barrel.

Within the projectile, the device includes a base, a cantilever beam, a stylus and a medium. The beam longitudinally extends at a first end from the base. The stylus connects to a second end of the beam, being longitudinally opposite from the first end. The medium is rigidly fixed relative to the base and indicates transverse deflection extent of the second end onto the medium.

In various exemplary embodiments, the transverse deflection extent can be vertically perpendicular to the beam. Other various embodiments alternatively or additionally provide for the stylus permitting deflection that is horizontally perpendicular to the beam.

Various exemplary embodiments provide a method for recording transverse acceleration of a projectile longitudinally traveling along a barrel. The method includes providing a base within the projectile, suspending a cantilever beam longitudinally within the projectile from the base from a first end of the beam, fixing a medium relative to the base.

In various exemplary embodiments, the method further includes connecting a stylus to a second end of said beam, the second end being opposite from the first end, the stylus indicating transverse deflection extent of the second end onto the medium.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Various exemplary embodiments provide a technique for measuring in-bore balloting loads of large caliber guns. This design incorporates a mechanical device that records balloting motion data that can then be extracted through the use of X-ray or similar imaging as the projectile exits the gun barrel.

The development of micro-electronics capable of surviving the severe axial accelerations of gun-launch has enabled the manufacture of instrumented projectiles that can be built and fired to measure accelerations in all three orthogonal axes. Although robust, instrumented slugs with accelerometers have limitations.

Accelerometers capable of surviving the severe launch accelerations can be expensive and thus limit the quantity of instrumented projectiles that can be fired to acquire a statistically relevant amount of information. Data collection can also become compromised under circumstances in which the accelerometers lack sufficient flight time to transmit their data or cannot be recovered intact.

Figure 1:
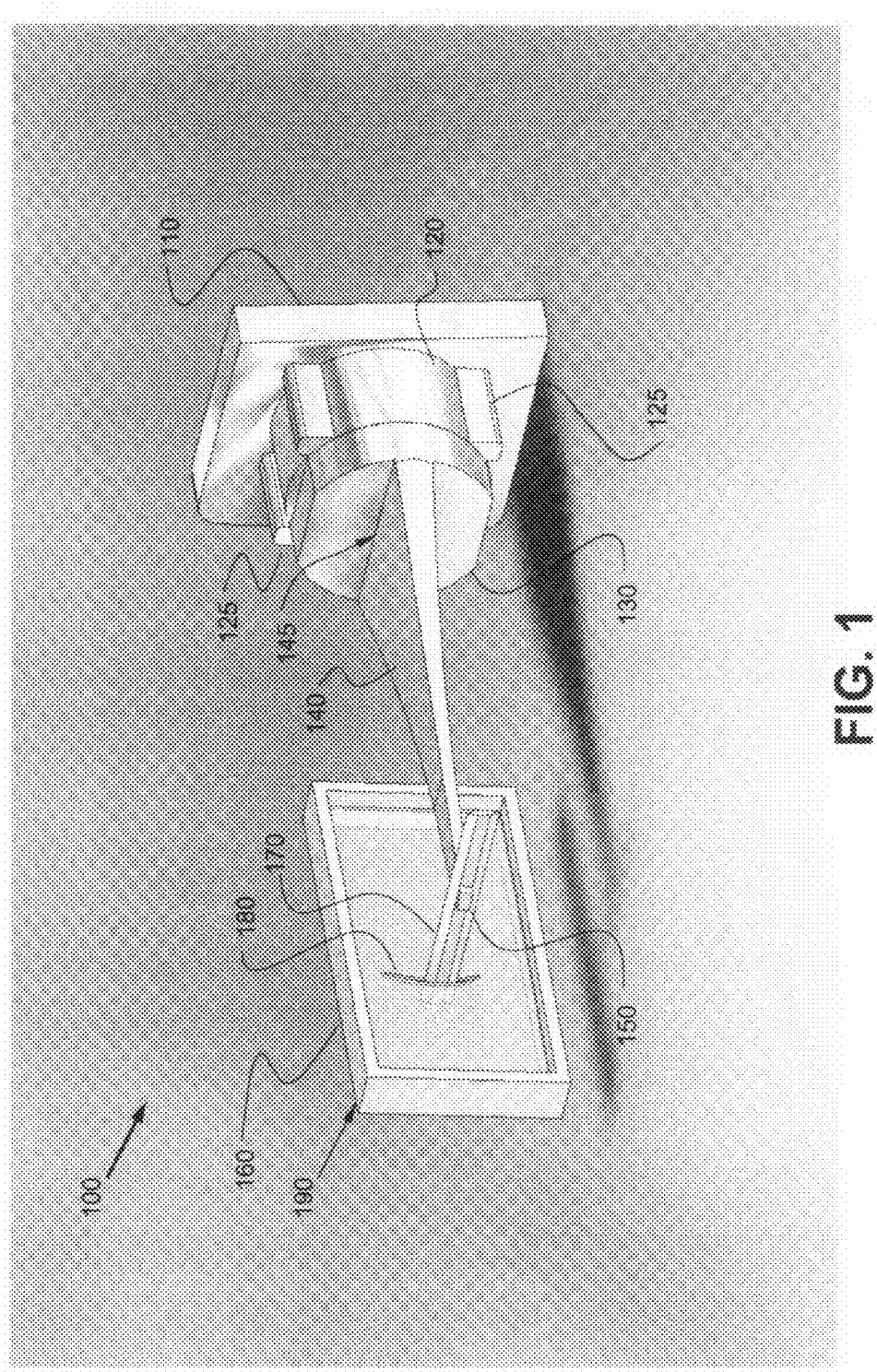
FIG. 1 is an isometric view of a balloting system.

FIG. 1 shows an isometric view 100 of a reed gauge balloting system within a test projectile loaded in a gun bore. An armature block 110 represents a mount platform with obverse and reverse sides respectively facing fore and aft within the gun bore. An anchor 120 and its flanking flanges 125 are disposed on the obverse side of the block 110 for shear reinforcement. A support base 130 is disposed forward of the anchor 120 for mounting a cantilever beam (or reed) 140 suspending from the base 130 at a proximal edge 145.

At the opposite distal end, the beam 140 has disposed thereon a free-end 150, which can translate laterally in yaw and pivot vertically in pitch. A scribal sensor (or marking foil) 160 is disposed adjacent to the beam 140. A transverse stylus 170 includes racers that define a slit along which the free-end 150 laterally translates.

The sensor 160 includes an arc slit 180 along which the stylus 170 can pitch vertically. A frame 190 mechanically records the vertical motion range of the stylus 170 in the sensor 160. The shape of the beam 140 and gravitational force facilitate a greater deflection (and thus larger range) in the vertical, rather than the horizontal, direction. The block 110 and the frame 190 are both mounted rigidly in the test projectile.

Figure 2:
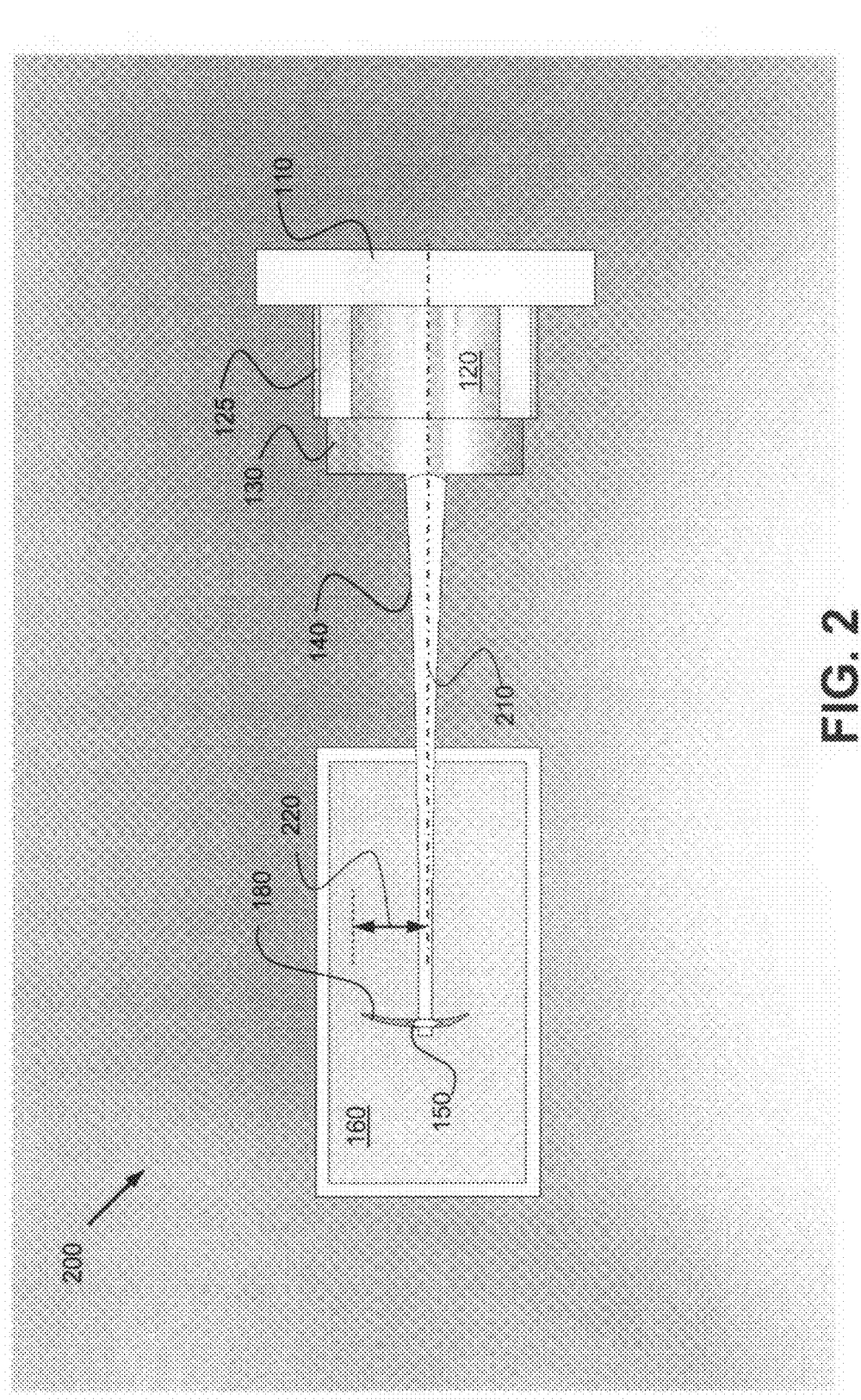
FIG. 2 is an elevation view of the balloting system.

FIG. 2 shows an elevation view 200 of the balloting system. The beam 140 extends along an axial centerline 210 from the base 130. The beam 140 gradually tapers in vertical thickness from slightly thicker at the base 130 to the free-end 150. The beam 140 tapers more precipitously in the horizontal thickness from these same respective ends. Artisans of ordinary skill will recognize that a non-tapering beam can be used without departing from the scope of the invention.

The arc slit 180 extends from the centerline 210 by a deflection distance 220 to be measured by the sensor 160, which can mechanically record travel of the stylus 170 by mechanical tearing or an alternate marking technique. The resulting deflection marks can be retrieved by X-ray photography of the system installed in the test projectile for physical linear measurement. Such imaging enables quantification of the projectile vibration along the barrel to be obtained without inducing distortion from projectile disassembly.

Various exemplary embodiments employ a mechanical reed-type gauge imbedded inside of a projectile. A stylus 150 on the end of the reed gauge marks the motion of the gauge on a sensor (e.g., a piece of metallic foil) 160. Then, as the projectile exits the gun barrel through the muzzle, an X-ray image can be recorded that enables the markings showing the extent 220 of the arc slit 180 from the reed gauge to be read. Analytical or numerical techniques can then be used to determine the balloting loads that correlate to the recorded reed gauge markings.

The mechanical reed represents a cantilever beam 140 with a weight and stylus 170 at the free-end 150 to enable tuning to a specific natural frequency of vibration. When a vibratory load is imposed at the base 130, the beam 140 begins to oscillate at its natural frequency, and the stylus 170 marks the length of the arc slit 180 of the oscillation. This recorded displacement, together with the information about the reed gauge can be used to determine the peak loads experienced by the projectile.

For various exemplary embodiments, the stylus 170 can be replaced with an alternative marking device that is both robust and readable by X-ray imaging. The stylus 170 employs a knife edge and a piece of metallic foil as the sensor 160. Therefore, when the beam 140 vibrates, i.e., the free-end 150 of the beam 140, the knife edge would cut the foil, leaving a permanent marking. The projectile may preferably be designed to be relatively transparent to X-ray imaging to enable the metal foil to show clearly. This can be easily accomplished through a judicious choice of materials.

The projectile designed for this test is hollow, with the reed gauge being entirely enclosed within its shell to avoid destroying the gauge. A smoothbore gun can ensure that the X-ray imaging remains perpendicular or nearly perpendicular to the sensor 160 without spin from rifling.

This functions because the projectile at rest leaves the reed gauge in the neutral, or rest position. Upon acceleration of the projectile along the barrel, the reed gauge remains in the neutral position. However, as the projectile contacts the sides of the barrel, the impact force causes the beam 140 to oscillate and mark the sensor 160 (as metallic foil) with the slit 180.

Upon leaving the barrel and imaging the projectile, the sensor 160 shows the maximum travel that the stylus 170 has experienced regardless of its position at the time the picture was taken. The reed gauge can be tuned to the natural frequencies of interest. Incorporating multiple gauges can be performed into a single projectile, each tuned for a different frequency, space being the only limiter.

As described, the sensor 160 of the metallic foil can denote by cut and/or puncture the arc motion of the stylus 170. Alternatively, the sensor 160 can represent a medium on which the stylus 170 can inscribe a marking thereon.

This measuring technique provides an advantage of recording accelerations from balloting in a severe test environment not conventionally performed. This gauge is not affected by the relatively short free flight time of the projectile. Additionally, this technique enables numerous projectiles to be fired and measured with little additional cost relative to that of a standard slug, and at a fraction of the cost of an instrumented slug. Thus, the reed gauge enables measuring shock loads into the projectile so that the data can be read with an X-ray imaging apparatus.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A device for recording transverse acceleration of a projectile longitudinally traveling along a barrel, said device comprising:
    a base disposed within the projectile;
    a cantilever beam longitudinally extending at a first end from said base and within the projectile;
    a stylus connected to a second end of said beam, said second end being longitudinally opposite from said first end; and
    a medium rigidly fixed within the projectile relative to said base, said stylus indicating transverse deflection extent of said second end onto said medium.

2. The device according to claim 1, wherein said medium is a metal foil and said stylus incises into said foil.

3. The device according to claim 1, wherein said transverse deflection extent is vertically perpendicular to said beam.

4. The device according to claim 3, wherein said stylus permits deflection that is horizontally perpendicular to said beam.

5. A method for recording transverse acceleration of a projectile longitudinally traveling along a barrel, said method comprising:
    providing a base within the projectile;
    suspending a cantilever beam longitudinally within the projectile from said base from a first end of said beam;
    fixing a medium relative to said base; and
    connecting a stylus to a second end of said beam, said second end being opposite from said first end, said stylus indicating transverse deflection extent of said second end onto said medium.

* * * * *